United States Patent [19]

Poytress

[11] 4,207,727
[45] Jun. 17, 1980

[54] HARVESTING DEVICE

[76] Inventor: Roderick J. Poytress, 6696 S. West Ave., Fresno, Calif. 93706

[21] Appl. No.: 900,876

[22] Filed: Apr. 28, 1978

[51] Int. Cl.² ............................................. A01D 46/00
[52] U.S. Cl. ....................................................... 56/330
[58] Field of Search ............................. 56/27.5, 33–35, 56/330, 328 TS, 29

[56] References Cited

U.S. PATENT DOCUMENTS

| | | | |
|---|---|---|---|
| 1,069,997 | 8/1913 | Appleby | 56/33 |
| 1,780,820 | 11/1930 | Hahn | 56/255 |
| 2,516,473 | 7/1950 | McLendon | 56/14.7 |
| 2,571,865 | 10/1951 | Greedy et al. | 56/64 |
| 2,714,281 | 8/1955 | Steele | 56/329 |
| 2,893,194 | 7/1959 | Lamouria | 56/331 |
| 2,929,184 | 3/1960 | Lamouria | 56/1 |
| 3,126,692 | 3/1964 | Weygandt et al. | 56/330 |
| 3,187,493 | 6/1965 | Harrett | 56/330 |
| 3,203,159 | 8/1965 | Weygandt et al. | 56/1 |
| 3,245,211 | 4/1966 | Weygandt et al. | 56/330 |
| 3,305,113 | 2/1967 | Gardner | 214/83.1 |
| 3,328,944 | 7/1967 | Shepardson | 56/331 |
| 3,360,913 | 1/1968 | Burton | 56/330 |
| 3,439,482 | 4/1969 | Orton | 56/330 |
| 3,490,217 | 1/1970 | Olmo et al. | 56/330 |
| 3,492,801 | 2/1970 | Olmo et al. | 56/330 |
| 3,584,446 | 6/1971 | Bernshausen | 56/328 |
| 3,601,964 | 8/1971 | Fisher | 56/330 |
| 3,601,965 | 8/1971 | Kaessbohrer | 56/330 |
| 3,636,688 | 1/1972 | Fontan | 56/330 |
| 3,667,201 | 6/1972 | Claxton | 56/330 |
| 3,762,139 | 10/1973 | Tompkins | 56/328 TS |
| 3,766,724 | 10/1973 | Paillou | 56/331 |
| 3,783,595 | 1/1974 | Tolochko et al. | 56/331 |
| 3,827,503 | 8/1974 | Hansen | 171/38 |
| 3,830,048 | 8/1974 | Ervin | 56/331 |
| 3,848,399 | 11/1974 | Makeham | 56/13.9 |
| 3,890,774 | 6/1975 | Bruel | 56/330 |
| 3,996,730 | 12/1976 | Dorfer | 56/330 |

Primary Examiner—Russell R. Kinsey
Attorney, Agent, or Firm—Huebner & Worrel

[57] ABSTRACT

A harvesting device having a harvesting member elongated along a longitudinal axis; mounts affixing the member for rotation about an axis of rotation eccentric to the longitudinal axis of the member; and a mechanism for rotating the member about the axis of rotation to impart a crop dislodging motion.

19 Claims, 11 Drawing Figures

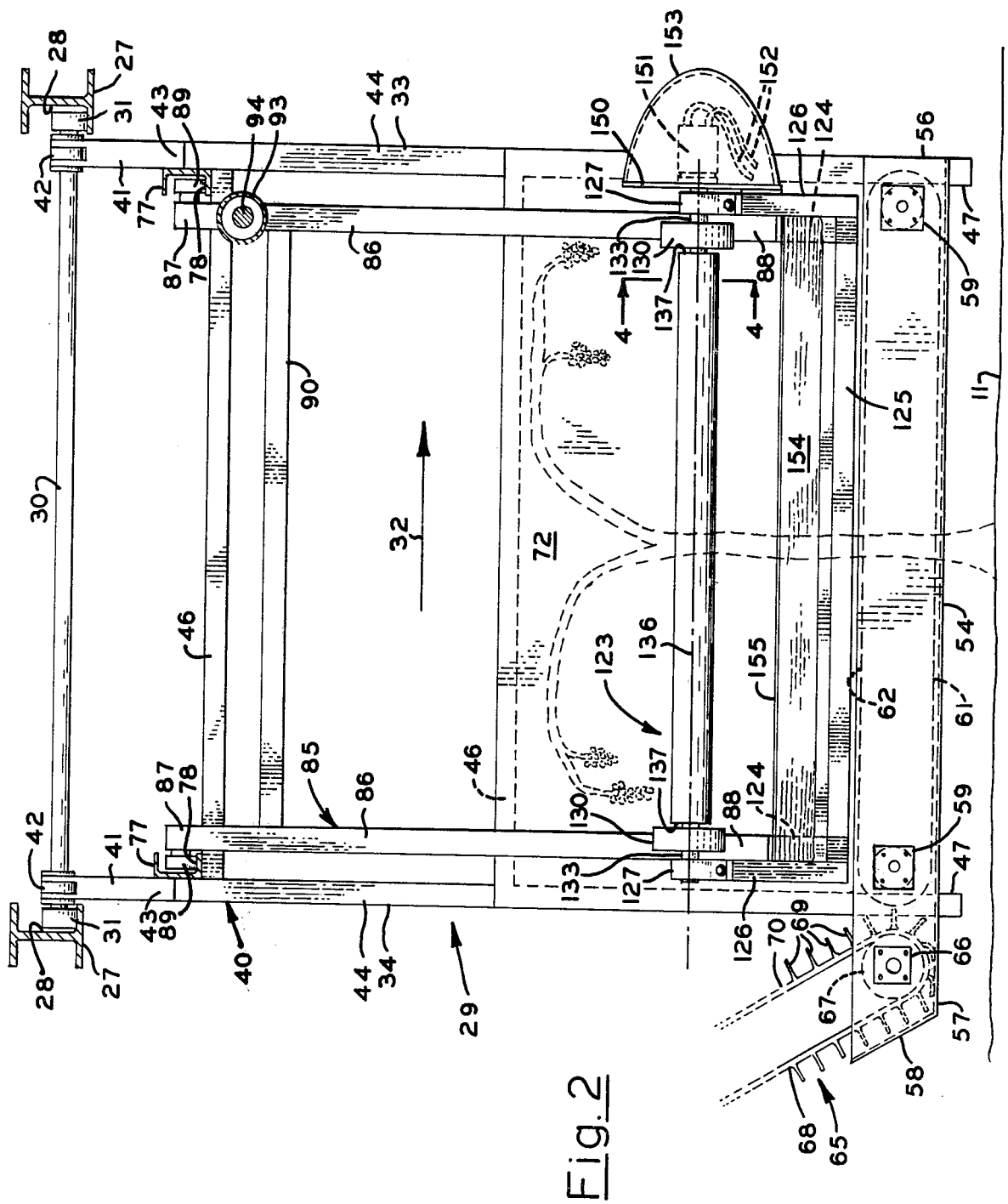

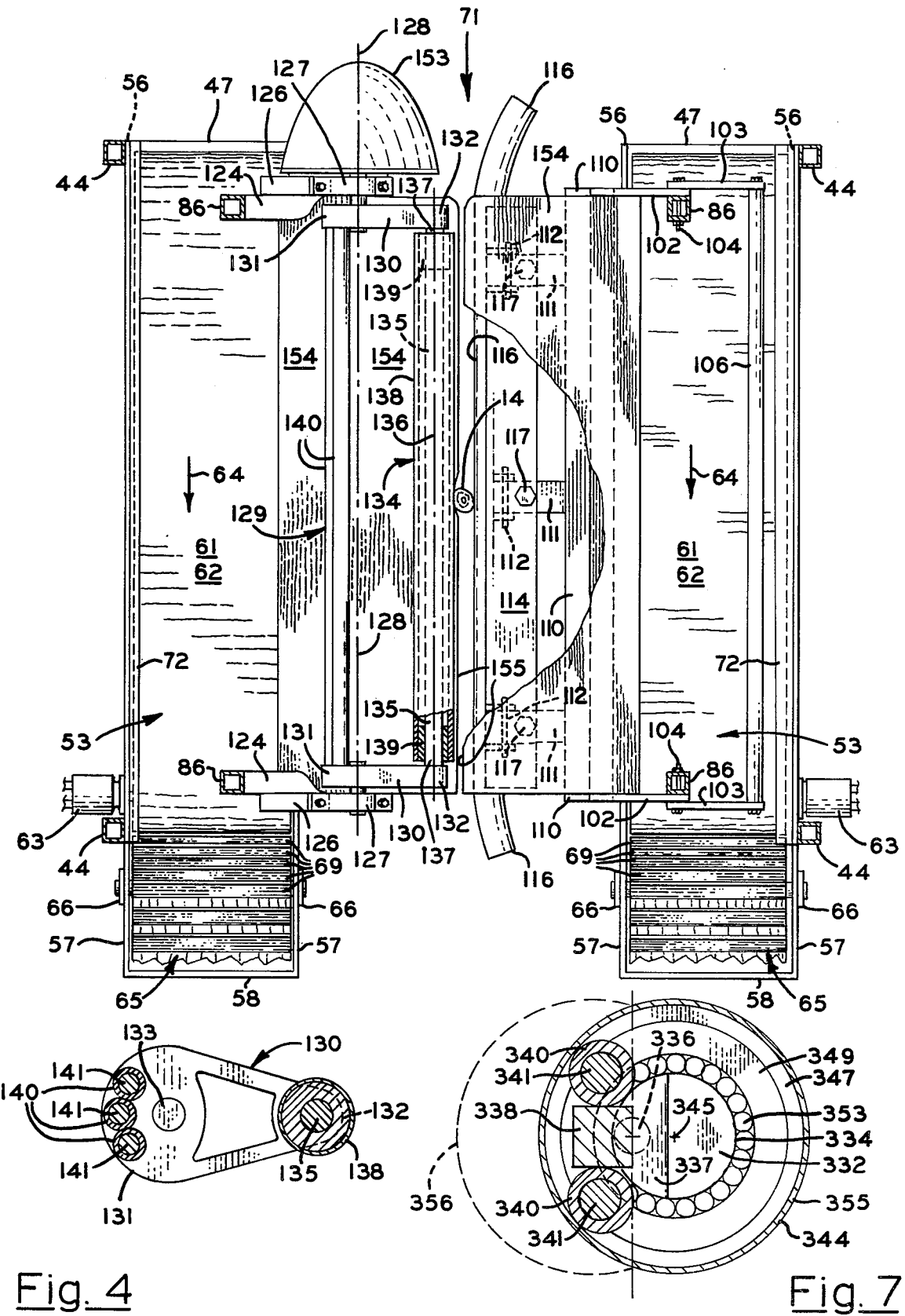

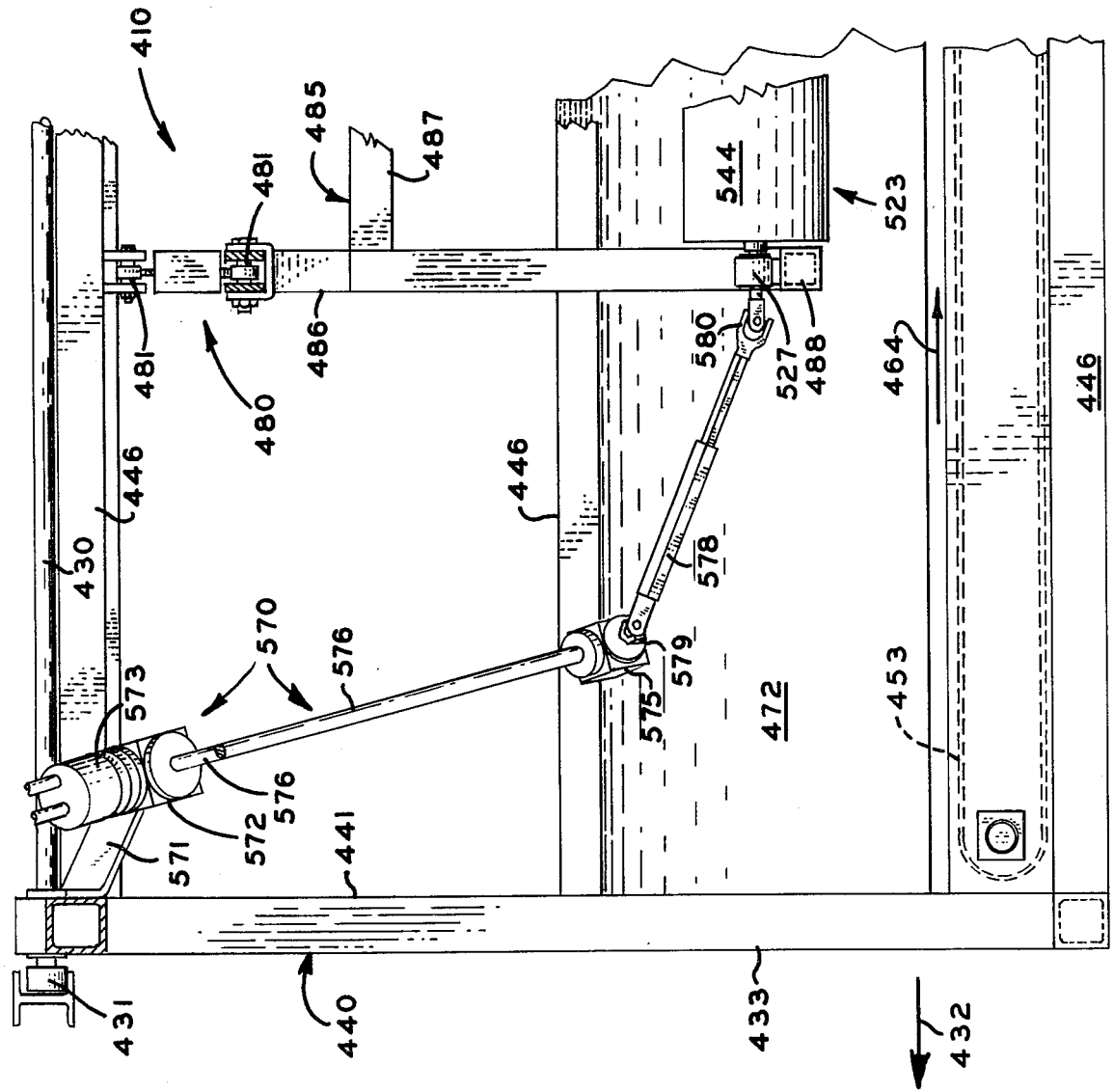

HARVESTING DEVICE

BACKGROUND OF THE INVENTION

1. Field of the Invention

The present invention relates to an improved harvesting device and more particularly to such a harvesting device which is adaptable for use in a variety of types of mechanical harvesting operations where a crop dislodging motion must be applied to the bearing plants, the harvesting device of the present invention operating to insulate the plants and the device itself from the destructive forces inherent in the application of such motion in conventional harvesters.

2. Description of the Prior Art

In the harvesting of virtually all crops in which the crop to be harvested is grown above the earth surface and wherein the bearing plants are not harvested with the crop, mechanical harvesting operations require the application of some form of motion to the individual plants to dislodge the crop. It will be understood that the word "plant" is used herein in its broadest sense to include all plants, vines, bushes, trees, and all other such plant life. Similarly, the word "crop" is used herein to indicate all growths to be harvested from bearing plants.

Prior art practices in the application of motion during mechanical harvesting operations include a wide variety of devices which are brought into contact with the plants. These prior art devices include rods which are employed to beat the plants to dislodge the crop; assemblies which, in the case of trees, are clamped on their trunks and which apply a force transversely of the trunk to dislodge the crop; vertical panels which swing while in engagement with the plants; and a variety of other such contrivances. All prior art devices of which the applicant is aware suffer from chronic difficulties which, heretofore, have had to be endured.

One of the most debilitating problems, is that the mechanisms which impart the harvesting motion similarly impart a destructive motion to the harvester itself. Stated more precisely, the application of a given force to a plant produces an equal reactive force in the harvester. Over relatively short periods of use, this reactive force tends to shake the harvester apart and to cause excessive wearing of its operative components.

Another chronic problem with conventional mechanical harvesters is that they are, to varying degrees, destructive to the individual plants causing injury to trunks, foliage and the like as well as to the crops. The damage frequently is to such a degree as to effect the future productive capacity of the plants. Although this trauma has been viewed as a necessary evil in mechanical harvesting operations, it is nonetheless a severe problem.

Therefore, it has long been known that it would be desirable to have a harvesting device which minimizes or eliminates the destructive forces inherent in the use of prior art harvesters and which overcomes the multitude of other problems which have plagued their use.

SUMMARY OF THE INVENTION

Therefore, it is an object of the present invention to provide an improved harvesting device in which a motion is applied to the plants to dislodge the crops therefrom.

Another object is to provide such a harvesting device which minimizes or eliminates the transmission of destructive reactive forces, generated in the application of crop dislodging motion during harvesting, through the device and transporting vehicle.

Another object is to provide such a harvesting device which applies the harvesting motion to the plants in a rolling motion protective of the plants while being of sufficient magnitude to dislodge the crops from the plants.

Another object is to provide such a harvesting device in which the harvesting motion is applied to the plants in a path of movement generally in the direction of the crops to be harvested from those plants.

Another object is to provide such a harvesting device which is balanced in a manner which permits the application of a force to and against the plants while eliminating the destructive effect of the reacting force on the device and carrying vehicle.

Another object is to provide such a harvesting device which employs rotary motion moving about an axis of rotation substantially parallel to a row of plants to be harvested and in which the force applying portion of the assembly is eccentric to the axis of rotation.

Another object is to provide such a harvesting device which has a plant contacting portion which is mounted for freewheeling motion to apply the harvesting force through a member in freewheeling contact with the plants.

Further objects and advantages are to provide improved elements and arrangements thereof in a device for the purposes described which is dependable, economical, durable and fully effective in accomplishing its intended purposes.

BRIEF DESCRIPTION OF THE DRAWINGS

FIG. 2 is a longitudinal vertical section taken on line 2—2 in FIG. 1.

FIG. 3 is a horizontal section taken on line 3—3 in FIG. 1.

FIG. 4 is a somewhat enlarged transverse vertical section taken on line 4—4 in FIG. 2.

FIG. 7 is a transverse vertical section taken on line 7—7 in FIG. 6.

FIG. 11 is a fragmentary longitudinal vertical section taken on line 11—11 in FIG. 10.

DESCRIPTION OF THE FIRST EMBODIMENT

Figure 1:
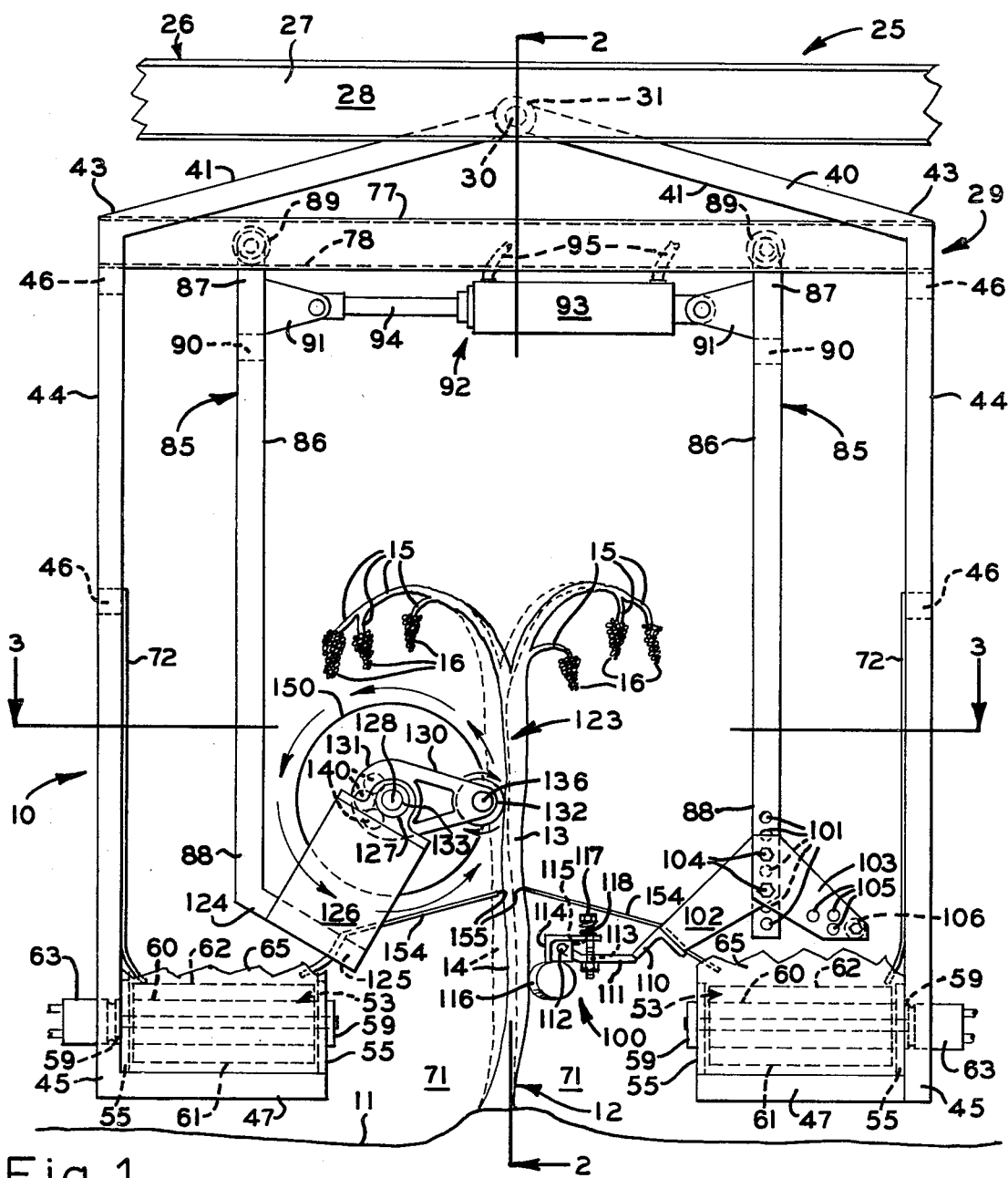
FIG. 1 is a rear elevation of a first embodiment of the harvesting device of the present invention shown in a typical operative environment mounted on a suitable carrying vehicle which is fragmentarily shown.

Referring more particularly to the drawings, the first embodiment of the harvesting device of the present invention is generally indicated by the numeral 10 in FIG. 1. It will become apparent that the harvesting device of the embodiments of the invention shown and described herein can be employed on many types of carrying vehicles or harvesters in the harvesting of a wide variety of crops. The environment shown in the drawings is illustrative of only one such application. As shown in FIG. 1, the earth surface is indicated at 11. A row 12, composed of a multitude of aligned plants, in this case grapevines 13, extends upwardly from the earth surface. Each grapevine has a trunk 14 from which are grown canes 15 supporting grapes 16 grown in bunches. For illustrative convenience, the grapevines are not shown supported on trellis wires which are themselves held in spaced relation to the earth surface by posts or stakes. It will, however, be understood that the device 10 is fully operable as described herein where such stakes and trellis wires are employed.

The harvesting device 10 can be adapted for use in a variety of types of harvesters or carrying vehicles as previously noted. As shown in FIG. 1, the device is borne by a carrying vehicle or harvester 25 which has a suitable mobile main frame 26. The frame 26 is adapted for movement along the earth surface 11 above and straddling the row 12, as shown in FIG. 1. The main frame 26 includes a pair of supporting members or I-beams 27 extending substantially transversely of the intended direction of travel of the harvester and consequently transversely of the row to be harvested. Each of the I-beams has a track or guideway 28 therein.

The harvesting device 10 has a harvesting unit 29 which is suspended on the harvester 25 for individual alignment with a row 12, as best shown in FIG. 1. More than one such harvesting unit can be mounted on the frame to permit the simultaneous harvesting of more than one row if desired. The harvesting unit has an elongated support shaft 30 rotationally mounting support wheels 31 at the opposite ends thereof. The wheels are individually, rotationally received in the guideways 28 of the I-beams 27. Thus, the harvesting unit is free to travel transversely of the main frame to maintain alignment with the row about which it extends.

The harvesting unit 29 is adapted to be transported by the harvester 25 in a normal operational direction of travel indicated by arrow 32 from left to right as viewed in FIG. 2. The harvesting unit has a forward portion 33 and a rearward portion 34 with respect to this direction of travel.

The harvesting unit 29 has a subframe 40 which is pivotally mounted on the support shaft 30 extending in suspended relation downwardly therefrom. The subframe has two pairs of opposed tubular beams 41. The beams of each pair are jointed at their upper interior ends being interconnected by a bearing 42 mounted for rotational movement about the support shaft 30. The pairs of beams have lower outer ends 43. Four corner posts 44 are individually affixed, as by welding, on the lower outer ends of the tubular beams. The posts extend downwardly therefrom in vertical, substantially parallel relation. The posts have individual lower ends 45. A pair of longitudinal frame members 46 are secured on and interconnect the posts on each side of the harvesting unit. The frame members of each pair are disposed in spaced, substantially parallel relation and maintain the posts in fixed relation relative to each other. A transverse frame member 47 is mounted, as by welding, on the lower end of each of the posts and extends inwardly therefrom normal to its respective post.

The transverse frame members 47 on each side of the harvesting unit 29 individually mount a horizontal conveyor assembly 53. The conveyor assemblies extend in spaced, substantially parallel relation to each other, adjacent to the earth surface 11 and longitudinally of the harvesting unit. Each conveyor assembly has a housing 54 secured on its respective frame members 47 and has a pair of spaced, substantially parallel side plates 55. The side plates have forward end portions 56 and rearward end portions 57 relative to the direction of travel indicated by arrow 32. The housing 54 has a collection trough 58 bounded by the rearward end portions 57 of the side plates. Two sets of bearings 59 are borne by the side plates of each conveyor assembly individually adjacent to the forward and rearward portions 33 and 34 of the harvesting unit. A roller assembly 60 is rotationally received in each set of bearings. A conveyor belt 61, having an upper run 62 is trained about the roller assemblies of each conveyor assembly in driven relation. An hydraulic drive motor 63 is secured on the outermost side plate 55 of each conveyor asembly in driving engagement with the roller assembly 60 thereof at the rearward portion 34 of the harvesting unit. The hydraulic drive motor is adapted to be driven by a suitable hydraulic system, not shown, to move the upper run 62 of its respective conveyor belt in a rearward direction of movement indicated by arrow 64.

A lifting conveyor assembly 65 is mounted on the rearward end portions 57 of the side plates 55 of each horizontal conveyor assembly 53. The lifting conveyor assemblies 65 are shown fragmentarily in the drawings. It will be understood that they communicate at upper ends, not shown, with a suitable mechanism for collecting the harvested crop, in this case the grapes 16. Each lifting conveyor assembly has a pair of bearings 66 mounted on the rearward end portions 58 of its respective horizontal conveyor assembly. A lower roller assembly 67 is received for rotational movement in the bearings 66 within the collection trough 58. A conveyor belt 68, mounting a plurality of panels or cleats 69, is extended for rotational movement about the lower roller assembly 67 and about a corresponding roller assembly, not shown, at the upper end thereof. A suitable drive mechanism, not shown, is adapted to move an upper run 70 thereof in an upward direction of travel.

The horizontal and lifting conveyor assemblies 53 and 65 on opposite sides of the harvesting unit 29 define a path of travel 71 therebetween. A panel 72 is fastened on the lowermost longitudinal frame member 46 on each side of the harvesting unit and is connected to the outermost side plate 55 of the adjacent horizontal conveyor assembly and the adjacent corner posts 44. Each panel 72 thus forms a barrier for the purpose of containing the harvested crop within the device.

The harvesting unit 29 mounts a pair of transverse supporting channel members 77 which interconnect the lower outer ends 43 of the tubular beams 41 in the forward and rearward portions 33 and 34 respectively of the harvesting unit. The channel members 77 extend transversely of the harvesting unit, as best shown in FIG. 1, and are disposed in horizontal attitudes. Each channel member 77 defines a track or guideway 78 extending therealong facing inwardly of the harvesting unit, as can best be visualized in FIG. 2.

The harvesting device 10 has a pair of interior frames 85 which are independently suspended within the harvesting unit 29 inwardly of the corner posts 44. Each of the frames is composed of a pair of forward and rearward vertical members 86 having individual upper end portions 87 and opposite lower end portions 88. Wheel assemblies 89 are individually rotationally mounted on the upper end portions 87 of the vertical members. The wheel assemblies are rotationally received in the guideways 78 of the channel members 77 for movement therealong transversely of the harvesting unit. The vertical members on corresponding sides of the harvesting unit are interconnected by longitudinal members 90 so as to maintain the vertical members in rigidly spaced, substantially parallel relation.

The vertical members 86 adjacent to the forward portion 33 of the harvesting unit 29 individually mount flanges 91 on the upper end portions 87 thereof. A hydraulic cylinder 92, composed of coacting cylinder and piston portions 93 and 94 respectively, is connected to the mounting flanges 91 as shown in FIG. 1. The hydraulic cylinder is operable to maintain the interior frames 85 in adjustably spaced relation. Hydraulic hoses 95 are connected to the cylinder portion in the conventional manner and are connected at their opposite ends to a suitable hydraulic control system, not shown.

The harvesting device 10, has a guide assembly 100 which is borne by the lower end portions 88 of the vertical members 86 on the right as viewed in FIG. 1. The lower end portions of those vertical members have a plurality of corresponding, vertically aligned bolt holes 101 extending therethrough. A pair of guide mounting plates 102 are individually secured on the lower end portions of the vertical members 86 on the right as viewed in FIGS. 1 and 3 and extend inwardly and downwardly therefrom. A pair of counterweight mounting plates 103 are individually affixed on the same vertical members extending outwardly and downwardly therefrom. The pairs of mounting plates 102 and 103, respectively, are secured in position on their respective vertical members by nut and bolt assemblies 104 extending through the plates and the bolt holes 101 and tightened to retain the plates in position. Vertical repositioning of the mounting plates can be obtained by selecting the appropriate bolt holes 101. The counterweight mounting plates 103 have a plurality of corresponding bolt holes 105 therein remote from their respective vertical members 86. A counterweight assembly 106 is affixed on and interconnects the counterweight mounting plates 103. The counterweight assembly is secured in position using the bolt holes 105. It will be seen that the relative position of the counterweight assembly on the mounting plates 103 can be changed using the bolt holes 105 to increase or decrease the counterbalancing effect of the assembly. If additional weight is required, two or more counterweight assemblies can be mounted on the mounting plates. Additionally, counterweight assemblies of varying weights can be employed to select the desired effect.

An angle iron bar 110 is secured, as by welding, on the remote ends of the guide mounting plates 102 extending therebetween substantially parallel to the adjacent horizontal conveyor assembly 53. Three mounting plates 111 are affixed on the angle iron bar in spaced relation to each other. Each mounting plate 111 has an upwardly and inwardly disposed pivotal connection 112 on the inner edge thereof. A screwthreaded bore 113 is formed in each of the mounting plates 111 adjacent to the pivotal connection thereof. A pivot bar 114 is mounted on the pivotal connections 112 for pivotal movement about an axis substantially parallel to the angle iron bar 110. The pivot bar has three holes 115 extending therethrough in individual vertical alignment with one of the bores 113. A cushioned guide bar 116 is fastened on the pivot bar 114 for pivotal movement therewith. The guide bar is of a sufficient diameter to extend farther inwardly between the conveyor assemblies than any other portion of the guide assembly for sliding engagement with the trunk 14 of each grapevine 13, as best shown in FIG. 1. A vertical threaded stud or bolt 117, having a compression spring 118 received thereabout, is extended through each hole 115 of the pivot bar and is threaded in the bore 113 therebelow. The bolts are mounted in the positions with their respective springs bearing downwardly on the pivot bar so as resiliently to urge the guide bar 116 into engagement with the grapevines in the row 12 during harvesting.

A shaking mechanism or harvesting assembly 123 is mounted on the interior frame 85 on the left as viewed in FIG. 1. The assembly has a pair of diagonal members 124 which are individually fastened, as by welding, on the lower end portions 88 of the vertical members 86 of the internal frame 85 on the left as viewed in FIG. 1. The diagonal members extend inwardly and downwardly from their respective lower end portions in substantially parallel relation. A beam 125 is affixed on and interconnects the free ends of the diagonal members extending longitudinally of the harvesting unit 29 substantially parallel to the angle iron bar 110. A mount 126 is fastened on each diagonal member extending inwardly and upwardly therefrom substantially normal to its respective diagonal member. Each mount has a bearing 127 affixed on the upper end thereof. The bearings define an axis of rotation 128 which is substantially parallel to the direction of travel indicated by arrow 32 of the harvester 25 and thus the row 12 during normal use of the harvester.

The harvesting assembly 123 has a frame 129. The frame has a pair of end plates 130 each of which has an enlarged semi-circular portion 131 and a remote portion 132, as can best be seen in FIG. 1. Each plate mounts a stub shaft 133 concentric to the semi-circular portion and extending outwardly from the plate substantially normal thereto. The stub shafts of the end plates are disposed in axial alignment and are individually, rotationally received in their respective bearings 127, as best shown in FIG. 3. A cylindrical member 134 has an elongated shaft 135 having a longitudinal axis 136. The shaft has opposite end portions 137 which are individually mounted on the remote portions 132 of the end plates 130 so as to interconnect them as shown in FIGS. 2 and 3. The shaft is mounted so as to be substantially parallel to the axis of rotation 128 defined by the bearings 127. The cylindrical member includes a cylinder 138 disposed about the shaft 135 and mounted thereon for rotation about and concentric to the longitudinal axis 136 by a pair of bearings 139. Thus, the cylinder is free to rotate about the longitudinal axis of the shaft in a "freewheeling" manner. The cylinder can also be rotated with the end plates 130 about the axis of rotation 128 for engagement with the row 12, as will hereinafter be described.

Three counterbalance rods 140 are mounted on and interconnect the semi-circular portions 131 of the end plates 130. The counterbalance rods are positioned in parallel and preferably equally spaced relation to the axis of rotation 128 on the side thereof opposite to the cylindrical member 134. Each rod is tubular and is filled with lead or other suitable material 141 to provide a sufficient counterbalancing weight. The positioning and collective weight of the counterbalance rods and semicircular portions of the end plates 130 is such as to substantially balance the weight of the cylindrical member 134 and remote portions 132 of the end plates. Stated another way, the frame 129 is balanced so that it can be positioned in any attitude about its axis of rotation 128 and will not be gravitationally motivated therefrom. Thus, the cylindrical member 134 is free to rotate or orbit about the axis of rotation 128 and is also rotational in a freewheeling manner about its longitudinal axis 136. It will be understood that the counterbalance rods, as shown and described herein, constitute the preferred form in that they provide the desired balance for proper operation of the frame 129 while reinforcing the frame to insure a long operational life. However, variations can be made in the structure to achieve the desired counterbalancing effect without departing from the scope of the invention.

A circular mounting plate 150 is fastened on the mount 126 at the forward portion 33 of the harvesting unit 29 with a portion of the stub shaft 133 at the forward portion 33 extending through the mounting plate, as can best be seen in FIG. 2. An hydraulic motor 151 is supported by the mounting plate in driving engagement with the portion of the stub shaft 133 extending through the mounting plate. The hydraulic motor mounts hydraulic hoses 152 which communicate with a suitable hydraulic system, not shown, for driving the hydraulic motor. A guide housing 153, preferably having the paraboloidal configuration visible in FIGS. 2 and 3, is removably fastened on the mounting plate in covering relation to the hydraulic motor.

Flexible panels 154 are individually fastened on the angle iron bar 110 and the beam 125 extending the lengths thereof. The individual panels extend from positions overhanging their respective adjacent horizontal conveyor assemblies 53 inwardly and upwardly to juxtaposed inner edges 155.

SECOND EMBODIMENT

Figure 5:
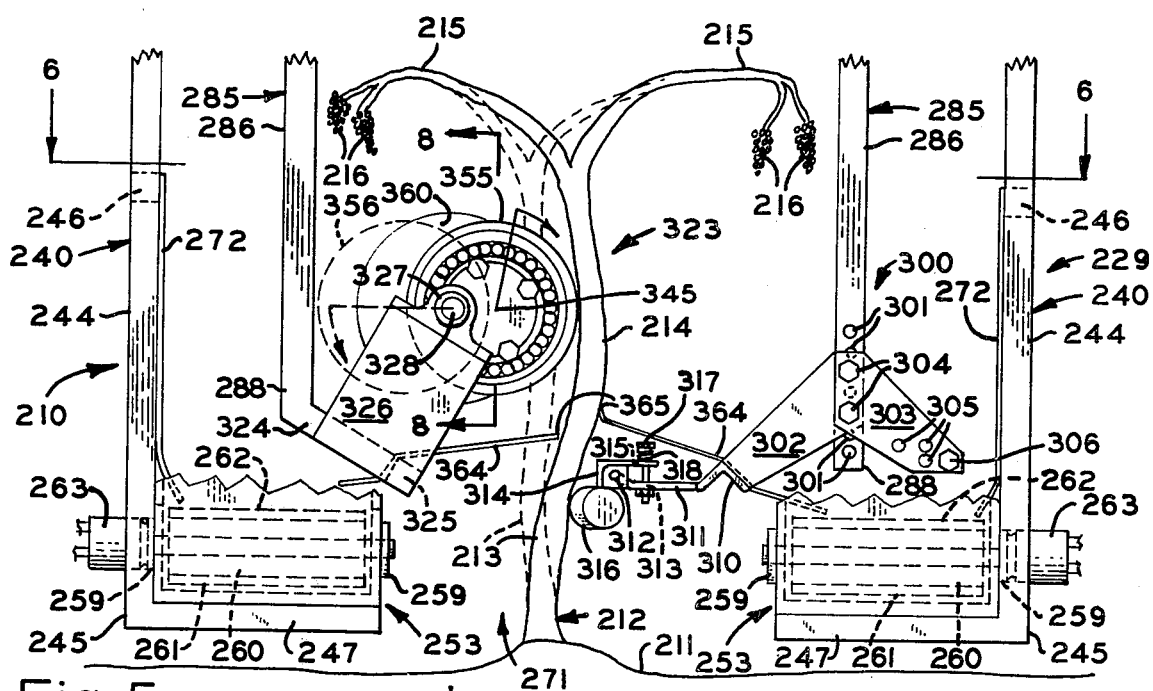
FIG. 5 is a fragmentary rear elevation of a second embodiment of the harvesting device of the present invention shown in a typical operative environment and showing the harvesting member thereof in a retracted position in phantom lines and an extended position in full lines.

The harvesting device of the second embodiment of the present invention is identified by the numeral 210 and is shown in FIGS. 5, 6, 7, 8 and 9. The harvesting device 210 is in many respects substantially identical to the harvesting device 10 previously described. For purposes of illustrative convenience, the harvesting device 210 is shown in FIG. 5 in an operative environment corresponding to that of FIG. 1 with respect to the harvesting device 10. As shown in FIG. 5, the earth surface is indicated at 211 with a row 212 of plants or grapevines 213 growing upwardly therefrom. Each grapevine has a trunk 214 supporting canes 215 on which grapes 216 are grown.

It will be understood that the harvesting device 210 is supported on a suitable support or carrying vehicle, not shown, having the elements previously described of harvester 25 with respect to the description of the first embodiment of the invention.

The harvesting device 210 has a harvesting unit 229 supported by the carrying vehicle for earth traversing movement along the row 212 of grapevines 213. The harvesting unit possesses the same elements previously described in connection with device 10 even though they are not shown in FIGS. 5 or 6. The harvesting unit has a forward portion 233 and a rearward portion 234 with respect to the normal operational direction of travel indicated by arrow 232 in FIG. 6.

The harvesting unit 229 has a subframe 240 affording four substantially parallel and vertical corner posts 244. The corner posts have lower ends 245. The corner posts on each side of the subframe are interconnected by a pair of substantially parallel longitudinal frame members 246 to retain the subframe in longitudinally rigid relation. Transverse frame members 247 are individually secured, as by welding, on the lower ends 245 of the corner posts 244 extending inwardly of the harvesting unit 229 and normal to their respective posts.

The transverse frame members 247 on each side of the harvesting unit 229 individually mount a horizontal conveyor assembly 253. The horizontal conveyor assemblies are mounted on the subframe 240 in spaced, substantially parallel relation to each other extending longitudinally of the harvesting unit. Each horizontal conveyor assembly has a housing 254, mounted on its respective frame members 247, affording a pair of upright substantially parallel side plates 255. The side plates have forward end portions 256 and rearward end portions 257 relative to the normal operational direction of travel indicated by arrow 232. The housing 254 has a collection trough 258 bounded by the rearward end portions 257 of the side plates. Two sets of bearings 259 are supported by the side plates of each conveyor assembly individually adjacent to the forward and rearward portions 233 and 234 of the harvesting unit. A roller assembly 260 is rotationally supported by each set of bearings. A conveyor belt 261, having an upper run 262, is extended about the roller assemblies of each conveyor assembly. An hydraulic drive motor 263 is supported by the outermost side plate 255 of each horizontal conveyor assembly in driving engagement with the roller assembly 260 thereof at the rearward portion 234 of the harvesting unit. The hydraulic drive motor is adapted to be driven by a suitable hydraulic system, not shown, to move the upper run 262 of the conveyor belt in a rearward direction of movement indicated by arrow 264.

A lifting conveyor assembly 265 is mounted on the rearward end portions 257 of the side plates 255 of each horizontal conveyor assembly 253. The lifting conveyor assemblies are shown fragmentarily in the drawings. It will be understood that they operate in the manner described with respect to harvesting device 10 and communicate at upper ends, not shown, with a suitable mechanism for collecting the harvested crop, in this case the grapes 216. The horizontal and lifting conveyor assemblies 253 and 265 respectively on opposite sides of the harvesting unit define a path of travel 271 therebetween. A panel 272 is fastened on the lowermost longitudinal frame member 246 on each side of the harvesting unit and is connected to the outermost side of the plate 255 of the adjacent horizontal conveyor assembly 253 and to the adjacent corner posts 244. Each panel 272 thus forms a barrier for the purpose of containing the harvested crop within the device during the harvesting operation.

It will be understood that the harvesting unit 229 possesses upper portions corresponding to those previously described for the harvesting unit 29 and shown in FIGS. 1 and 2. For illustrative convenience, these portions, since they are identical to those of harvesting unit 29, have not been shown in FIG. 5. The harvesting unit has a pair of interior frames 285 individually composed of a pair of vertical members 286 having lower portions 288. As described with respect to harvesting unit 29, the interior frames are movable on wheel assemblies, similar to those shown in FIGS. 1 and 2 for harvesting device 10, transversely of and within the harvesting unit. Similarly, the spacing of the frames with respect to each other can be controlled by a hydraulic cylinder, not shown.

The harvesting device 210 has a guide assembly 300, best shown in FIG. 5. The guide assembly 300 is borne by the lower end portion 288 of the vertical member 286 on the right as viewed in FIG. 5. The lower end portion of those vertical members have a plurality of corresponding vertically aligned bolt holes 301 extending therethrough. A pair of guide mounting plates 302 are individually mounted on the lower end portions of the vertical members 286 on the right as viewed in FIGS. 5 and 6 and extend inwardly and downwardly therefrom. A pair of counterweight mounting plates 303 are individually affixed on the same vertical members extending outwardly and downwardly therefrom. The pairs of mounting plates 302 and 303 respectively, are secured in position on their respective vertical members by nut and bolt assemblies 304 extending through the plates and the bolt holes 301 and tightened to retain the plates in position. As with the harvesting device 10, vertical repositioning of the mounting plates can be obtained by selecting the appropriate bolt holes 301.

The counterweight mounting plates 303 have a plurality of corresponding bolt holes 305 therein remote from their respective vertical members 286. A counterweight assembly 306 is fastened on and interconnects the counterweight mounting plates 303. The counterweight assembly is secured in position using the bolt holes 305. The relative position of the counterweight assembly on the mounting plates 303 can be changed using the bolt holes 305 to increase or decrease the counterbalancing effect of the assembly. If additional weight is required, two or more counterweight assemblies can be mounted on the mounting plates. Additionally, counterweight assemblies of varying weights can be employed.

Figure 6:
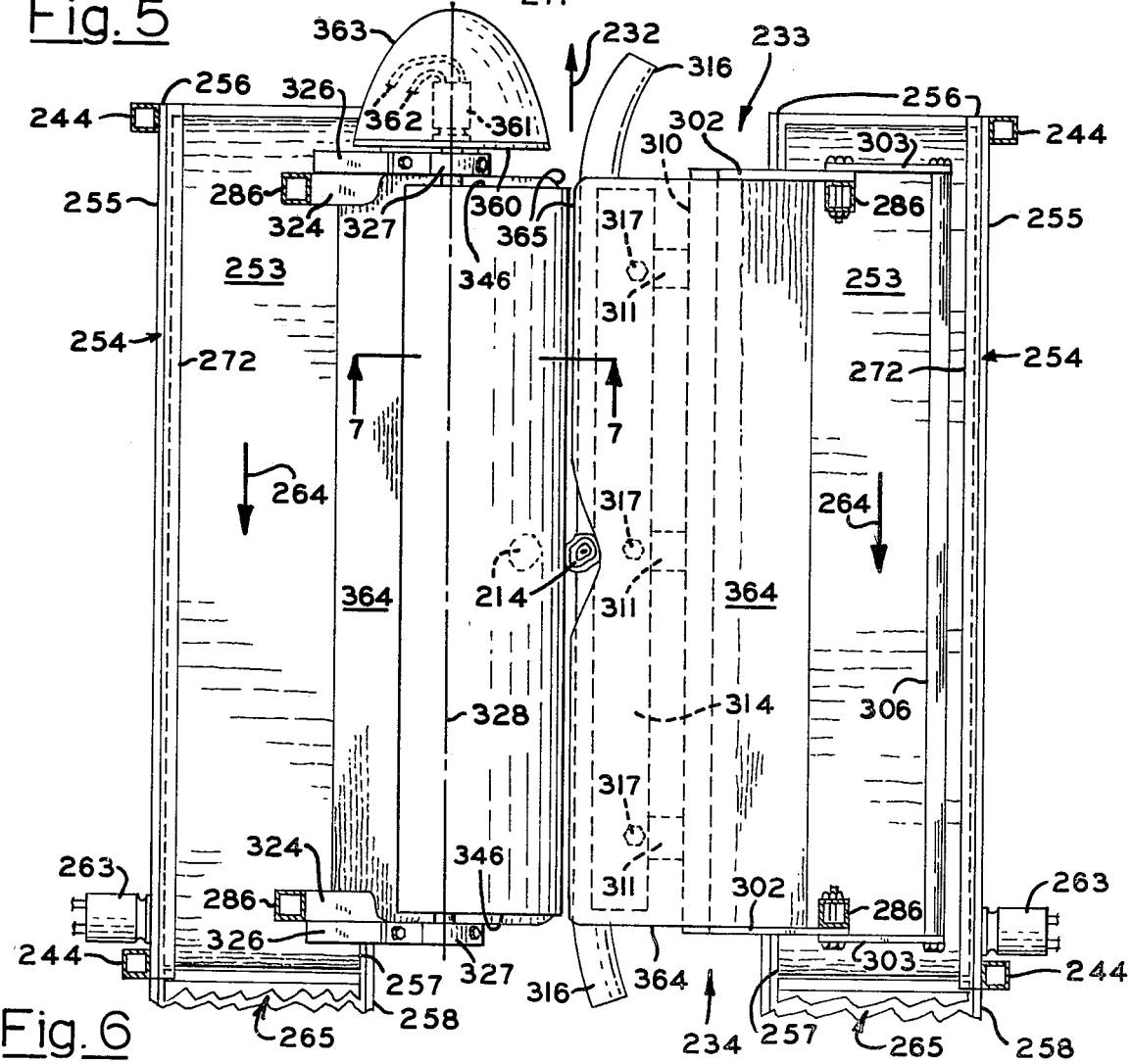
FIG. 6 is a horizontal section taken on line 6—6 in FIG. 5.

An angle iron bar 310 is fastened on the remote ends of the guide mounting plates 302 extending therebetween substantially parallel to the adjacent horizontal conveyor assembly 253. Three mounting plates 311 are affixed on the angle iron bar in spaced relation to each other. Each mounting plate 311 has an upwardly and inwardly disposed pivotal connection 312 on the interior edge thereof. A screwthreaded bore 313 is formed in each of the mounting plates 311 and adjacent to the pivotal connection thereof. A pivot bar 314 is mounted on the pivotal connections 312 for pivotal movement about an axis substantially parallel to the angle iron bar 310. The pivot bar has a passage 315 extending therethrough in individual vertical alignment with each of the bores 313. A cushioned guide bar 316 is fastened on the pivot bar 314 for pivotal movement therewith. The guide bar is of a sufficient diameter to extend farther into the path 271 between the conveyor assemblies 253 than any other portion of the guide assembly for sliding engagement with the trunk 214 of each grapevine 213, as best shown in FIGS. 5 and 6. A vertical stud or bolt 317, having a compression spring 318 received thereabout, is extended through each passage 315 of the pivot bar and screwthreadably secured in the bore 313 therebelow. The bolts are mounted in the position with their respective springs bearing downwardly on the pivot bar so as resiliently to urge the guide bar 316 into engagement with the grapevines in the row 212 during harvesting.

The harvesting device 210 has a shaking mechanism or harvesting assembly 323 which is operable to apply crop dislodging motion to the individual grapevines 213 in the row 212. The harvesting assembly has diagonal members 324 individually mounted, as by welding, on the lower end portions 288 of the vertical members 286 on the left as viewed in FIG. 5. A beam 325 interconnects the remote ends of the diagonal members extending substantially parallel to the adjacent horizontal conveyor assembly 253. A mount 326 is affixed on each of the diagonal members 324 extending upwardly and inwardly therefrom as shown in FIG. 5. A bearing 327 is mounted on the upwardly extending end of each mount. The bearings are aligned to define an axis of rotation 328 extending longitudinally of the harvesting unit 229 substantially parallel to the normal operational direction of movement for the harvesting device 210 indicated by the arrow 232.

The harvesting assembly 323 has a core unit 329 which is rotationally mounted in the bearings 327. The core unit includes a pair of hubs 330, each having an outer face 331 and an opposite inner face 332. Each hub is circumscribed by a cylindrical bearing seat 333 which is bounded adjacent to the outer face by a radially extending flange 334. Three screwthreaded bores 335 are formed in the outer face 331 of each hub in proximity to the bearing seat 333 thereof. Each hub mounts a stub shaft 336 on the outer face thereof eccentric to the axis of the hub and normal to the outer face. A mounting member 337 is affixed on the inner face 332 of each hub in substantial alignment with the stub shaft thereof. A weight bar 338 is mounted on and interconnects the mounting members 337 of the hubs 330 so as axially to align the stub shafts 336. As can best be seen in FIGS. 8 and 9 the weight bar is laterally offset with respect to the mounting members 337 to define a space 339 between the weight bar and the flange 334 of each hub. The stub shafts are individually rotationally mounted in the bearings 327 for rotation of the core unit about the axis of rotation 328 defined by the bearings. Two tubular counterbalance rods 340 are fastened, as by welding, on opposite sides of the weight bar. The counterbalance rods contain sufficient lead 341 to achieve the desired counterbalance effect, as will hereinafter be described.

Figure 8:
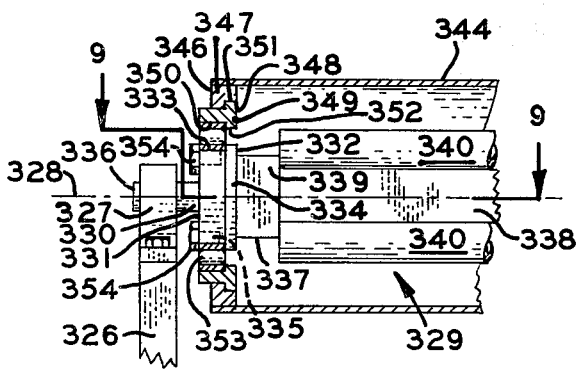
FIG. 8 is a somewhat enlarged fragmentary longitudinal section taken on line 8—8 in FIG. 5.
Figure 9:
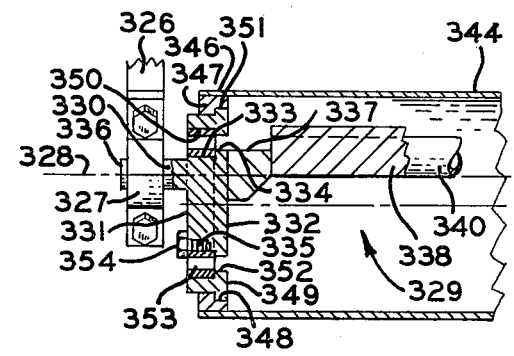
FIG. 9 is a fragmentary longitudinal section taken from a position indicated by line 9—9 in FIG. 8.

The harvesting assembly 323 has a cylindrical member or sleeve 344 having a longitudinal axis 345 and opposite end portions 346. An annular ring 347 is affixed within each opposite end of the sleeve and has an internal seat 348 concentric to the sleeve and facing inwardly thereof. Locking collars 349 have internal cylindrical bearing seats 350. Each collar has an outer peripheral flange 351 and an inner flange 352, both of which are disposed at substantially right angles to the bearing seat. Each collar is received within one of the annular rings with its outer flange seated in the internal seat 348 of the ring so as to position its respective bearing seat 350 concentric to the sleeve. Each hub 330 of the core unit 329 is received within one of the locking collars with a bearing assembly 353 fitted around the hub between the bearing seat 333 of the hub and the bearing seat 350 of the locking collar. Three setscrews 354 are individually screwthreadably secured in the bores 335 to capture the bearing assembly between the hub and the locking collar as best shown in FIG. 8. The bearing assemblies 353 thus maintain the sleeve in a freewheeling rotational condition. Consequently, the sleeve is rotational on the harvesting device 323 eccentric to the axis of rotation 328 defined by the bearings 327 and concentric to the longitudinal axis 345 of the sleeve. As shown in FIG. 5, the sleeve is moved during such rotation between an extended position 355 shown in full lines and a retracted position 356 shown in phantom lines.

A circular mounting plate 360 is fastened on the mount 326 at the forward portion 233 of the harvesting unit 229 with a portion of the stub shaft 336 extending through the mounting plate, as can best be seen in FIG. 6. An hydraulic motor 361 is supported by the mounting plate in driving engagement with the portion of the stub shaft extending through the mounting plate. The hydraulic motor mounts hydraulic hoses 362 which communicate with the hydraulic system, not shown, for driving the hydraulic motor. A guide housing 363, preferably having the paraboloidal configuration shown in FIG. 6, is removably secured on the mounting plate in covering relation to the hydraulic motor.

Flexible panels 364 are individually fastened on the angle iron bar 310 and on the beam 325 extending the entire length thereof and from positions overhanging their respective adjacent horizontal conveyor assemblies 253 to juxtaposed inner edges 365 over the path of travel 271 between the horizontal conveyor assemblies.

THIRD EMBODIMENT

Figure 10:
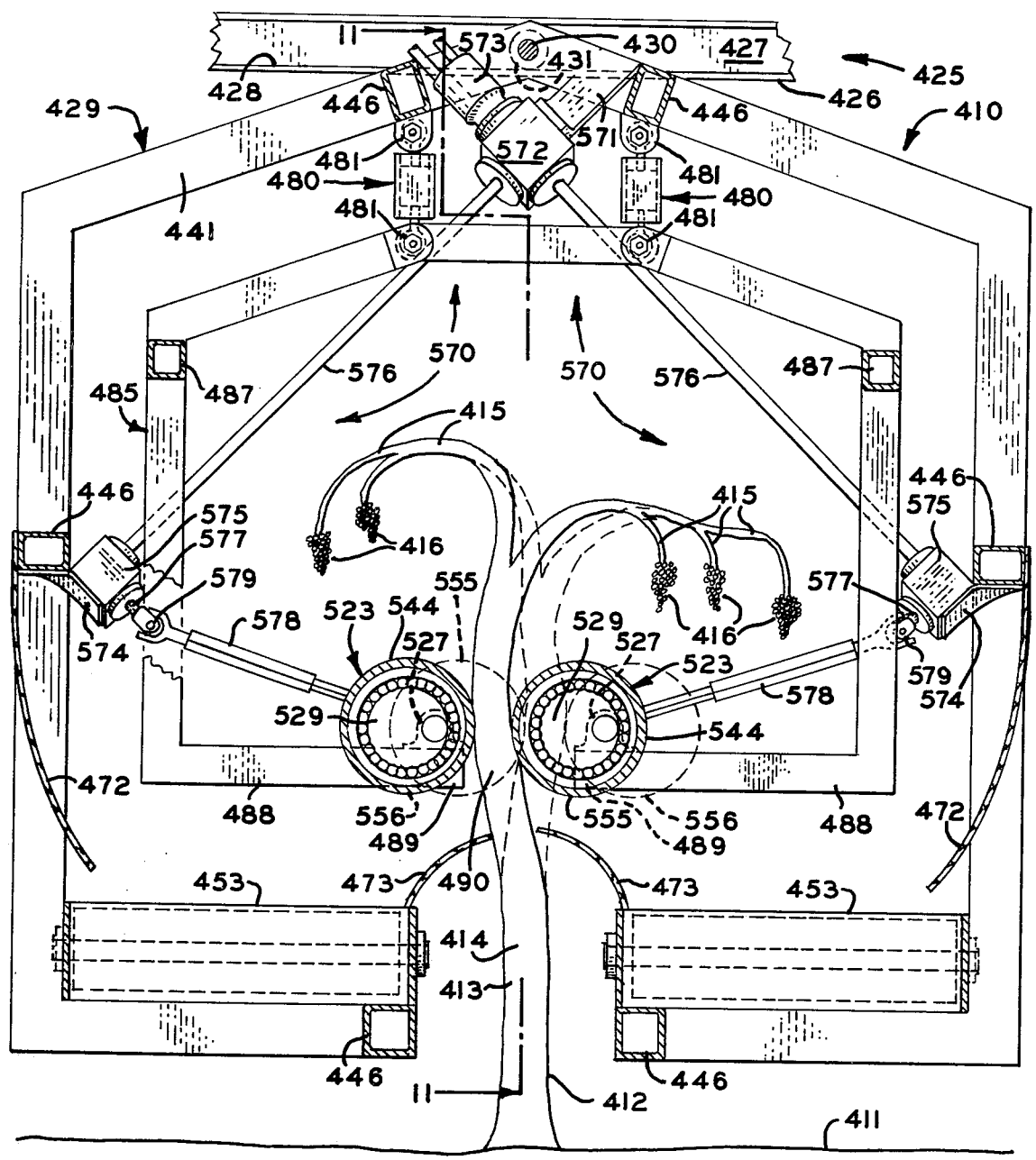
FIG. 10 is a fragmentary transverse vertical section of a third embodiment of the harvesting device of the present invention.

The harvesting device of the third embodiment of the present invention is identified by the numeral 410 and is shown in FIGS. 10 and 11. Harvesting device 410 is similar to both harvesting devices 10 and 210 in a number of respects. For clarity of understanding, FIGS. 10 and 11 serve to show primarily the distinctions between device 410 and the first and second embodiments 10 and 210 respectively of the present invention. As shown in FIG. 10, the earth surface is indicated at 411 with a row 412 of plants or grapevines 413 growing upwardly therefrom. Each grapevine has a trunk 414 supporting canes 415 on which grapes 416 are grown.

As with the previously described embodiment of the invention, the device 410 is supported on a suitable supporting or carrying vehicle 425 having a main frame 426 mounting parallel supporting members or I-beams 427 extending transversely of the normal direction of travel. Each of the I-beams 427 defines a track or guideway 428. A harvesting unit 429 is received in suspended relation extending between the I-beams 427. The harvesting unit has a support shaft 430 having support wheels 431 individually mounted at the opposite ends thereof. The harvester 425 and harvesting unit 429 are intended to be transported in the direction of travel indicated by arrow 432 in FIG. 11. The harvesting unit has a forward portion 433.

The harvesting unit 429 has a subframe 440 composed of parallel end frames 441 interconnected by spaced, substantially parallel longitudinal frame members 446.

A pair of horizontal conveyor assemblies 453, such as previously described with respect to the first and second embodiments 10 and 210 of the device of the present invention are mounted on the subframe 440 in spaced substantially parallel relation aligned with the direction of travel indicated by arrow 432. The conveyor assemblies are adapted to transport any material dropped thereon in a rearward direction indicated by arrow 464. The conveyor assemblies define a path of travel 471 therebetween. A pair of outer panels 472 are individually secured on the longitudinal frame members 446. A pair of inner panels 473 are individually secured on the conveyor assemblies extending over the path 471 defined therebetween. The panels 472 and 473 operate to confine harvested fruit to the subframe for deposit on the conveyor assemblies. It will be understood that the conveyor assemblies 453 deliver harvested fruit to lifting conveyor assemblies, such as that discussed in relation to the first and second embodiments 10 and 210 of the invention, for transport to a suitable collection area.

A pair of mounting assemblies 480 are individually secured on the longitudinal frame members 446 adjacent to the support shaft 430 adjacent to each end of the subframe. Each of the mounting assemblies has a pair of suitable pivotal connections 481 such as hime joints individually mounted at the opposite ends thereof. The upper pivotal connections of each mounting assembly is fastened on the longitudinal frame member 446, as best shown in FIG. 10.

An interior frame 485 is secured on and suspended from the pairs of mounting assemblies 480 by connection to the lower pivotal connections 481 thereof. Thus, as can best be seen in FIG. 10, the interior frame 485 is mounted for limited lateral or side to side movement in positions of parallelism with respect to the subframe 440 by virtue of the parallelogram connection formed by the mounting assemblies 480. The interior frame 485 is composed of a pair of end frames 486 interconnected by longitudinal frame members 487. Each end frame has a pair of horizontal beams 488 extending toward each other to inner end portions 489 defining a path 490 therebetween.

The primary distinction between the device 410 and the other embodiments of the present invention is in its usage of a pair of shaking mechanisms or harvesting assemblies 523. As can be seen in FIG. 10 a pair of such harvesting assemblies are mounted on the interior frame 485. It will be understood that although two such harvesting assemblies are employed in the device 410, each harvesting assembly is identical to the harvesting assembly 323 heretofore described with respect to the device 210 of the present invention. Thus, it will be unnecessary to identify the individual operative elements of each of the harvesting assemblies since they are identical to that of the device 210. For illustrative convenience, it will suffice to identify each harvesting assembly as being mounted on a pair of bearings 527 individually secured on the inner end portions 489 of corresponding horizontal beams 488 of the end frames 486. Each harvesting assembly 523 has a core unit 529 which is mounted for rotational movement in and eccentric to the bearings 527. Each core unit has a cylindrical member or sleeve 544 mounted for rotational movement about the core unit substantially concentric to the longitudinal axis of the core unit and eccentric to the axis defined by the bearings 527 in which the core unit is mounted.

Thus, the harvesting assemblies 523 of the harvesting device 410 is individually mounted for movement in positions of parallelism from extended positions 555 to retracted positions 556, as shown in FIG. 10. It will also be understood that the sleeve 544 of each harvesting assembly 523 is mounted for free-wheeling movement about the core unit 529 thereof. Similarly, each harvesting assembly is preferably rotated in a manner to transmit the contacting force upwardly along the trunk 414 of each grapevine 413. This is accomplished by rotation of the harvesting assembly 523 on the left as viewed in FIG. 10 in a counterclockwise direction and the harvesting assembly on the right as viewed in FIG. 10 in a clockwise direction. Such movement is, of course, as previously described, eccentric to the axes of rotation defined by their respective bearings 527.

The harvesting device 410 has a synchronizing or hydraulic drive assembly 570. The drive assembly includes a mount 571 secured as by welding on the end frame 441 at the forward portion 443 of the harvesting unit 429 in proximity to the support shaft 430. A main gear box 572 is borne by the mount in an operative position and has an hydraulic motor 573 mounted thereon in driving relation to the gear box. A pair of mounts 574 are individually secured on the longitudinal frame members 446 of the subframe 440 on opposite sides of the subframe, as can best be seen in FIG. 10. A right angle gear box 575 is affixed on each mount 574, as shown in FIG. 10. A pair of drive shafts 576 individually operatively interconnect the main gear box 572 and each of the right angle gear boxes 575 in driving relation thereto.

Each right angle gear box 575 has an output shaft 577. Thus, it will be seen that operation of the hydraulic motor 573 by a suitable hydraulic system, not shown, causes the impelling force to be transferred through the main gear box 572, in rotational movement through the drive shafts 576 and in rotational movement of the output shafts 577 of the right angle gear boxes. A pair of endwardly telescopically adjustable arms 578 individually interconnect the right angle gear boxes and the harvesting assemblies 523 through first universal joints 579, individually interconnecting the output shafts 577 and one end of the adjustable arm, and through second universal joints 580, individually interconnecting the opposite ends of their respective arms and the core units 529 of the harvesting assemblies. Thus, it will be seen that operation of the hydraulic motor operates to rotate the harvesting assemblies in the previously described counterclockwise and clockwise paths of travel as viewed in FIG. 10 synchronized to move in positions of parallelism to maintain the spacing shown in FIG. 10. This imparts a side to side motion to a grapevine 413 disposed between the assemblies.

Any side to side movement of the interior frame 485 by virtue of the mounting assemblies 480 is accommodated by the telescopic adjustment of the arms 578.

OPERATION

The operation of the described embodiments of the subject invention are believed to be clearly apparent and are briefly summarized at this point. For illustrative convenience, the operation of the harvesting devices 10, 210 and 410 will be described simultaneously where appropriate.

The harvesting devices 10 and 210 are first adjusted, using hydraulic cylinder 92 in the case of device 10 and the equivalent in the case of device 210, to position the interior frames 85 and 285 thereof and thus the operative equipment borne by the frames in the spaced relationship appropriate for harvesting the particular crops involved. The spaced relationship for the grapevines 13 and 213 is shown in FIG. 1 with respect to harvesting device 10 and in FIG. 5 with respect to harvesting device 210. Such adjustment is not necessary in the case of device 410. The carrying vehicle 25 in the case of device 10 and the equivalent in the case of devices 210 and 410 are then driven along their respective rows 12, 212 and 412 with the harvesting units 29, 229 and 429 thereof disposed in straddling relation to the row as shown in FIGS. 1, 5 and 10.

The hydraulic systems, not shown, are actuated to operate the hydraulic motors 151, 361 and 573 to drive their respective harvesting assemblies 123, 323 and 523. The hydraulic motors 63 and 263 are operated to drive the horizontal conveyor assemblies 53 and 253. Similarly, the lifting conveyor assemblies 65 and 265 are operated by suitable hydraulic motors to carry off the harvested crop. It will be understood that conveyor assemblies 453 and the equivalent lifting conveyor assemblies, not shown, are also operated in the case of device 410.

In the case of both harvesting devices 10 and 210, the operator directs the carrying vehicle along the row in such a manner that the guide housings 153 and 363 direct the trunks 14 and 214 of the grapevines 13 and 213 between the harvesting assemblies 123 and 323 and their respective guide bars 116 and 316. The trunks of the grapevines slide along the guide bars in relative movement. During such sliding movement the harvesting assemblies 123 and 323 engage the trunks of the grapevines above their respective guide bars to reciprocate the grapevines from side-to-side above the guide bar thereby transmitting a crop dislodging motion to the grapes 16 and 216 borne by the grapevines.

With respect to device 410, guide housings are not shown for illustrative convenience, although it will be understood that they can be employed. Similarly, guide bars are not employed in device 410 although they can be if desired.

With respect to the harvesting device 10, the cylindrical member 134 is carried preferably in a counterclockwise path of travel to and from the position shown in full lines in FIG. 1. The trunk 14 of the grapevine 13 above the guide bar 116 is thus reciprocated by the cylindrical member laterally of its normal position during movement of the grapevine between the cylindrical member and the guide bar. Since, as can be visualized in FIGS. 2 and 3, the period of time of such contact with each individual grapevine is relatively great, substantially all of the grapes 16 are dislodged from each grapevine by the time each grapevine exits in relative movement from the rearward portion 34 of the harvesting unit 29.

The cylindrical member 134 is thus driven in orbital movement around the axis of rotation 128 while simultaneously being free to rotate around the longitudinal axis 136 of the elongated shaft 135. Since the movement about the axis of rotation 128 is in a counterclockwise direction, as viewed in FIG. 1, the crop dislodging motion is transmitted upwardly through each grapevine in the direction of the grapes to be harvested. It will be seen that the cylindrical member maintains contact with the trunk of a grapevine for only an instant during each orbit. Thus, the sliding movement of the trunk horizontally relative to the cylindrical member during that instant is negligible. Since, during the instant of contact in each orbit, the cylindrical member is rotated about the longitudinal axis 136 by such contact in a direction effectively opposite to that of powered rotation of the harvesting assembly 123 as a whole, contact with each grapevine is achieved without sliding movement along a vertical path between the harvesting assembly and the grapevine. Accordingly, reciprocation of the grapevines during the harvesting operation is achieved with negligible abrasive contact between the grapevines and the harvesting assembly.

As previously noted, the counterbalance rods 140 operate to balance the weight of the cylindrical member 134 and other portions of the harvesting assembly 123 about the axis of rotation 128 so that substantially no reactive forces are transmitted through the harvesting device 10 in a manner which would be destructive to the harvesting device or to the carrying vehicle 25. The compression springs 118 operate resiliently to maintain the cushioned guide bar 116 in engagement with the trunks of the grapevines without causing damage thereto.

In the case of harvesting device 210, the harvesting assembly 323 is rotated about the axis of rotation 328 preferably in a counterclockwise direction as viewed in FIG. 5. Simultaneously, the sleeve 344 is free to rotate about the longitudinal axis 345 of the sleeve on the bearing assemblies 353. Accordingly, contact with the trunk 214 of each grapevine 213 causes the sleeve to be rotated in a clockwise direction as viewed in FIG. 5 by contact with the trunk of the grapevine in a manner similar to that described with respect to harvesting device 10. Thus, the powered rotation of the sleeve 344 about the axis of rotation 328 and the freewheeling rotational movement permitted about its longitudinal axis 345 operates in the manner just described for device 10 to protect the grapevines from damage. Similarly, the counterbalance rods 340 and the weight bar 338 of the core unit 329 operate to balance the harvesting assembly so that substantially no destructive forces are transmitted through the harvesting device and the carrying vehicle. Thus, the grapevines are reciprocated from side-to-side between the positions shown in full and in phantom lines in FIG. 5 without damage either to the grapevines or the harvesting device. The operation of the guide assembly 300 is substantially identical to that previously described with respect to the guide assembly 100 of the harvesting device 10.

In the case of device 410, each grapevine 413 is reciprocated from side to side between the harvesting assemblies 523 as shown in FIG. 10. Since their rotation is synchronized by means of the hydraulic drive assembly 570 to maintain the spacing shown in FIG. 10, there is no damage to the grapevines. As in the case of device 210, the freewheeling sleeves 544 reduce or eliminate any otherwise abrasive contact with the grapevines.

The harvesting devices 10, 210 and 410 thus impart crop dislodging motion to remove the grapes 16, 216 and 416 from the canes 15, 215 and 415 of the grapevines 13, 213 and 413. The grapes are gravitationally received on the panels 154, 364 and 473 and gravitationally delivered onto the upper runs 62 and 262 of the horizontal conveyor assemblies 53, 253 and 453. The horizontal conveyor assemblies transport the harvested crop onto the lifting conveyor assemblies 65 and 265 which transport the crop to a suitable collection mechanism. It will be seen that the interior frames 85 and 285 are free to travel along the guideways 78 so that misalignment between the row and the harvesting device 10 and 210 is automatically accommodated to some degree without the operator being forced to realign the carrying vehicle 25. This same effect is achieved in device 410 by the mounting assemblies 480 previously described.

Therefore, the harvesting devices 10, 210 and 410 of the present invention minimize the destructive forces inherent in the use of prior art harvesters to insure long operational lives while operating dependably and completely to harvest crops such as grapes and the like from their supporting plants with a negligible risk of injury thereto.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. A harvesting device for a mobile harvester adapted for movement along a row of crop bearing plants, the harvesting device comprising an elongated assembly defining an axis of rotation extending longitudinally thereof; a substantially cylindrical member borne by the assembly and having a longitudinal axis substantially parallel to said axis of rotation and spaced therefrom; a counterweight secured on the assembly adjacent to the axis of rotation on a side thereof remote from said longitudinal axis of the member; means mounting the assembly on the harvester for rotation about the axis of rotation thereof with said axis of rotation substantially parallel and adjacent to the plants during said movement of the harvester along the row; and means for rotating the assembly about the axis of rotation to carry said member in a path of movement against the plants to impart crop dislodging motion thereto.

2. The harvesting device of claim 1 wherein the substantially cylindrical member is borne by the assembly in spaced relation to the axis of rotation of the assembly and the counterweight.

3. The harvesting device of claim 2 wherein said member is mounted on the assembly for rotational movement substantially about its longitudinal axis permitting rolling and sliding contact with each plant as said crop dislodging motion is applied thereto during said movement of the harvester.

4. The harvesting device of claim 1 including a guide assembly secured on the harvester in spaced, substantially parallel relation to the cylindrical member for sliding contact with said plants below and on the opposite side of the plants from the cylindrical member to brace the plants below the position of application of the crop dislodging motion.

5. The harvesting device of claim 4 wherein the guide assembly is secured on the harvester by resilient means for accommodating variations in position between said harvester and the plants.

6. The harvesting device of claim 1 wherein the substantially cylindrical member is received about the assembly and the counterweight.

7. The harvesting device of claim 6 wherein the said member is mounted on the assembly for rotational movement substantially about its longitudinal axis permitting rolling and sliding contact with each plant during application of said crop dislodging motion and movement of the harvester.

8. The harvesting device of claim 1 wherein a pair of said substantially cylindrical members are borne by the harvester in spaced substantially parallel relation to each other defining a path therebetween for passage of the plants during said movement of the harvester along the row and synchronizing means operatively interconnect said members for moving said members in positions of parallelism to impart said crop disloding motion substantially transversely of the path.

9. A harvester for removing fruit and the like from bearing plants grown in a row comprising a mobile frame dimensioned for earth traversing movement above and along the row; a subframe suspended on the mobile frame having lower portions positioned for travel with said mobile frame on opposite sides of the row adjacent to the earth; means borne by said portions of the subframe for collecting the fruit removed by the harvester; a pair of interior frames suspended on and within the subframe and having lower portions individually disposed above the collecting means; a pair of bearings secured on the lower portion of one of the pair of interior frames and aligned to define an axis of rotation substantially parallel to the row during said earth traversing movement above and along the row; an assembly, having a pair of end plates individually mounted for rotation in the bearings and interconnected by braces, for rotation about said axis of rotation, the assembly having a counterweight affixed on one side of the axis of rotation and a cylinder borne by the plates for rotation about a longitudinal axis substantially parallel to said axis of rotation and on the opposite side thereof from the counterweight, and means operably connected to the assembly for rotating said assembly to carry the cylinder against plants during movement of the mobile frame above and along the row to impart motion to said plants transversely of the row for removing the fruit therefrom.

10. The harvester of claim 9 wherein the interior frames are individually suspended on the subframe for independent movement transversely of the subframe and means interconnect the interior frames for securing said frames in selected, fixed spaced relation to each other.

11. A harvesting device for a harvester adapted for movement along a row of crop bearing plants, the harvesting device comprising a harvesting member having a longitudinal axis; means mounting said member on the harvester for rotation about an axis of rotation spaced from said longitudinal axis of the member; and means for rotating the member about the axis of rotation to move the member in a path of movement against the row during said movement along the row to impart a crop dislodging motion to the row.

12. The harvesting device of claim 11 including balance means secured on the device on a side of the axis of rotation opposite that of the longitudinal axis of the member substantially to balance the weight of said member on opposite sides of the axis of rotation.

13. The harvesting device of claim 11 including means mounting the member for rotation substantially about said longitudinal axis.

14. The harvesting device of claim 11 wherein said axis of rotation and longitudinal axis are substantially parallel to each other.

15. A harvesting device for a harvester adapted for movement along a row of crop bearing plants, the harvesting device comprising an assembly having an axis of rotation extending longitudinally thereof; means mounting the assembly on the harvester for rotation about said axis of rotation in a position to be in proximity to the row during said movement along the row; a member, having a longitudinal axis along which is extended in spaced relation a generally convex row contacting portion, mounted on the assembly with said longitudinal axis eccentric to the axis of rotation of the assembly; and means for rotating the assembly about the axis of rotation to carry said portion in a path of travel against the row during said movement therealong to impart a crop dislodging motion to the row.

16. The harvesting device of claim 15 including means borne by the assembly adjacent to the axis of rotation on a side thereof substantially opposite to the longitudinal axis of the member for substantially balancing the assembly about the axis of rotation.

17. A harvesting device for a harvester adapted for movement along a row of crop bearing plants, the harvesting device comprising an assembly having an axis of rotation; means mounting the assembly on the harvester for rotation about said axis of rotation in a position to be in proximity to the row during said movement along the row; a second assembly having a substantially continuous surface extending along a longitudinal axis; means mounting the second assembly on the first assembly with the longitudinal axis of the second assembly eccentric to the axis of rotation of the first assembly; and means for moving the first assembly about the axis of rotation thereof to carry said continuous surface in a path of movement against the row to impart a crop dislodging motion thereto.

18. A harvesting device for a harvester adapted for movement along a row of crop bearing plants, the harvesting device comprising an assembly having an axis of rotation extending longitudinally thereof; means mounting the assembly in a harvesting position on the harvester for rotation about said axis of rotation; a generally tubular member, having a longitudinal axis, mounted on the assembly with said longitudinal axis spaced from the axis of rotation of the assembly; and means for rotating the assembly about the axis of rotation to carry said tubular member in a path of movement against the row to impart a crop dislodging motion thereto.

19. A harvesting device for a harvester adapted for movement along a row of crop bearing plants, the harvesting device comprising a harvesting member having a longitudinal axis; means mounting the member on the harvester for movement in a path of travel about an axis of rotation spaced from said longitudinal axis of the member and against the row during said movement along the row to impart crop dislodging motion to the row; means for moving the member in said path of travel; and means mounting the member for freewheeling rotation substantially about said longitudinal axis.

* * * * *